United States Patent
Bartley et al.

(10) Patent No.: US 10,622,316 B2
(45) Date of Patent: Apr. 14, 2020

(54) SECURITY ARRANGEMENT FOR INTEGRATED CIRCUITS USING MICROCAPSULES IN DIELECTRIC LAYER

(71) Applicant: International Business Machines Corporation, Armonk, NY (US)

(72) Inventors: Gerald K. Bartley, Rochester, MN (US); Darryl J. Becker, Rochester, MN (US); Matthew S. Doyle, Chatfield, MN (US); Mark J. Jeanson, Rochester, MN (US); Joseph Kuczynski, North Port, FL (US)

(73) Assignee: International Business Machines Corporation, Armonk, NY (US)

( * ) Notice: Subject to any disclaimer, the term of this patent is extended or adjusted under 35 U.S.C. 154(b) by 142 days.

(21) Appl. No.: 15/589,369

(22) Filed: May 8, 2017

(65) Prior Publication Data

US 2018/0323157 A1  Nov. 8, 2018

(51) Int. Cl.
| | | |
|---|---|---|
| *H01L 23/00* | (2006.01) | |
| *G06F 21/78* | (2013.01) | |
| *G06F 21/87* | (2013.01) | |
| *G06F 21/88* | (2013.01) | |

(52) U.S. Cl.
CPC ............ *H01L 23/576* (2013.01); *G06F 21/78* (2013.01); *G06F 21/87* (2013.01); *G06F 21/88* (2013.01); *H01L 23/573* (2013.01)

(58) Field of Classification Search
CPC ......... H01L 23/576; G06F 21/87; G06F 21/88
USPC .......................................................... 726/34
See application file for complete search history.

(56) References Cited

U.S. PATENT DOCUMENTS

| | | |
|---|---|---|
| 3,697,668 A | 10/1972 | Campbell |
| 5,237,307 A | 8/1993 | Gritton |
| 6,549,327 B2 | 4/2003 | Foucher et al. |
| 7,015,823 B1 | 3/2006 | Gillen et al. |
| 7,703,201 B2 | 4/2010 | Oggioni et al. |
| 8,084,855 B2 | 12/2011 | Lower et al. |
| 8,502,396 B2 | 8/2013 | Buer et al. |
| 8,836,509 B2 | 9/2014 | Lowy |
| 9,071,446 B2 | 6/2015 | Kreft |
| 9,390,295 B2 | 7/2016 | Franciscus Widdershoven et al. |
| 2008/0093742 A1* | 4/2008 | Walker ................ G06K 19/073 257/758 |
| 2009/0155571 A1* | 6/2009 | Mustonen .............. B41M 5/165 428/327 |

(Continued)

OTHER PUBLICATIONS

U.S. Appl. No. 15/459,573, entitled "Chain-Reactive Heat-Generating Microcapsules," filed Mar. 15, 2017.

*Primary Examiner* — Michael Pyzocha
*Assistant Examiner* — Zoha Piyadehghibi Tafaghodi
(74) *Attorney, Agent, or Firm* — Patterson + Sheridan, LLP (57) ABSTRACT

An apparatus comprises a plurality of conductive elements arranged within at least a first conductive layer and a dielectric layer comprising a plurality of microcapsules. The first conductive layer is arranged on a first side of the dielectric layer. The apparatus further comprises monitoring circuitry coupled with the plurality of conductive elements and configured to detect a change in an electrical parameter for at least a first conductive element of the plurality of conductive elements. The change in the electrical parameter indicates a physical intrusion of the dielectric layer that causes a rupture of one or more microcapsules of the plurality of microcapsules.

18 Claims, 5 Drawing Sheets

(56) References Cited

U.S. PATENT DOCUMENTS

| | | | |
|---|---|---|---|
| 2011/0089506 A1* | 4/2011 | Hoofman | G06F 21/87 257/417 |
| 2011/0227603 A1* | 9/2011 | Leon | H01L 23/576 326/8 |
| 2012/0067615 A1* | 3/2012 | Blaiszik | H01B 1/02 174/110 R |
| 2012/0125113 A1* | 5/2012 | Liu | G01L 9/0054 73/721 |

* cited by examiner

SECURITY ARRANGEMENT FOR INTEGRATED CIRCUITS USING MICROCAPSULES IN DIELECTRIC LAYER

BACKGROUND

The present disclosure relates generally to integrated circuits, and more specifically, to protecting electronic components and data stored in integrated circuits.

Protecting integrated circuit technology and data is a substantial concern in the commercial and industrial sectors. Integrated circuits and related devices are routinely acquired by motivated commercial and/or governmental competitors that seek to reverse engineer or to otherwise learn the functionality of the technology. The acquired information can be used by the competitors to provide a technological leap in their own devices, and/or to exploit a perceived weakness in the examined equipment. Thus, sophisticated governmental and commercial entities possess ample strategic and/or economic motivations to reverse engineer integrated circuit components.

Reverse engineering of an integrated circuit may be performed while the integrated circuit is in a powered-on state in order to observe its functionality. Designers of the integrated circuit may thus implement safeguard measures within the integrated circuit to take advantage of the powered-on state, such as a self-destruct or obstructing mechanism that is triggered by the detection of tampering. However, such safeguard measures may not distinguish between sensitive components and non-sensitive components of the integrated circuit, such that a detected tampering event may disable or otherwise affect operation of the non-sensitive components.

SUMMARY

According to one embodiment, an apparatus comprises a plurality of conductive elements arranged within at least a first conductive layer, a dielectric layer comprising a plurality of microcapsules, the first conductive layer arranged on a first side of the dielectric layer, and monitoring circuitry coupled with the plurality of conductive elements and configured to detect a change in an electrical parameter for at least a first conductive element of the plurality of conductive elements. The change in the electrical parameter indicates a physical intrusion of the dielectric layer that causes a rupture of one or more microcapsules of the plurality of microcapsules.

According to another embodiment, an integrated circuit comprises one or more layers having a plurality of electronic components defined therein, and a security arrangement comprising: a plurality of conductive elements arranged within at least a first conductive layer and overlapping at least some of the plurality of electronic components, and a dielectric layer comprising a plurality of microcapsules, the first conductive layer arranged on a first side of the dielectric layer. The integrated circuit further comprises monitoring circuitry configured to: detect, responsive to a physical intrusion of the security arrangement that causes a rupture of one or more microcapsules of the plurality of microcapsules, a change in an electrical parameter for at least a first conductive element of the plurality of conductive elements, and responsively determine, based on which of the plurality of electronic components are overlapped by the first conductive element, whether to perform a predefined security action.

According to another embodiment, a method is disclosed for use with a security arrangement comprising a plurality of conductive elements arranged within at least a first conductive layer, and further comprising a dielectric layer comprising a plurality of microcapsules. The method comprises increasing, responsive to a physical intrusion of the security arrangement that causes a rupture of one or more microcapsules of the plurality of microcapsules, a conductivity of the dielectric layer at a location of the rupture, and detecting, responsive to increasing the conductivity of the dielectric layer at the location of the rupture, a change in an electrical parameter for at least a first conductive element of the plurality of conductive elements.

DETAILED DESCRIPTION

The descriptions of the various embodiments of the present disclosure are presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, any reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system."

Various embodiments disclosed herein describe security arrangements for integrated circuits that are capable of providing localized detection and/or response to detected tampering events. For example, different security actions (or no security action) may be performed based on whether the tampering event occurs in the proximity of sensitive circuitry or not. The security arrangement generally comprises one or more conductive layers that define a plurality of conductive elements, as well as a dielectric layer comprising a plurality of microcapsules. A physical intrusion of the dielectric layer can cause a rupture of one or more microcapsules. The rupture of the one or more microcapsules releases material into the dielectric layer and changes a conductivity of the dielectric layer. The changed conductivity of the dielectric layer affects electrical parameters related to one or more of the plurality of conductive elements. Based on which conductive element(s) are affected by the changed conductivity, a suitable response to the tampering event can be determined.

Figure 1:
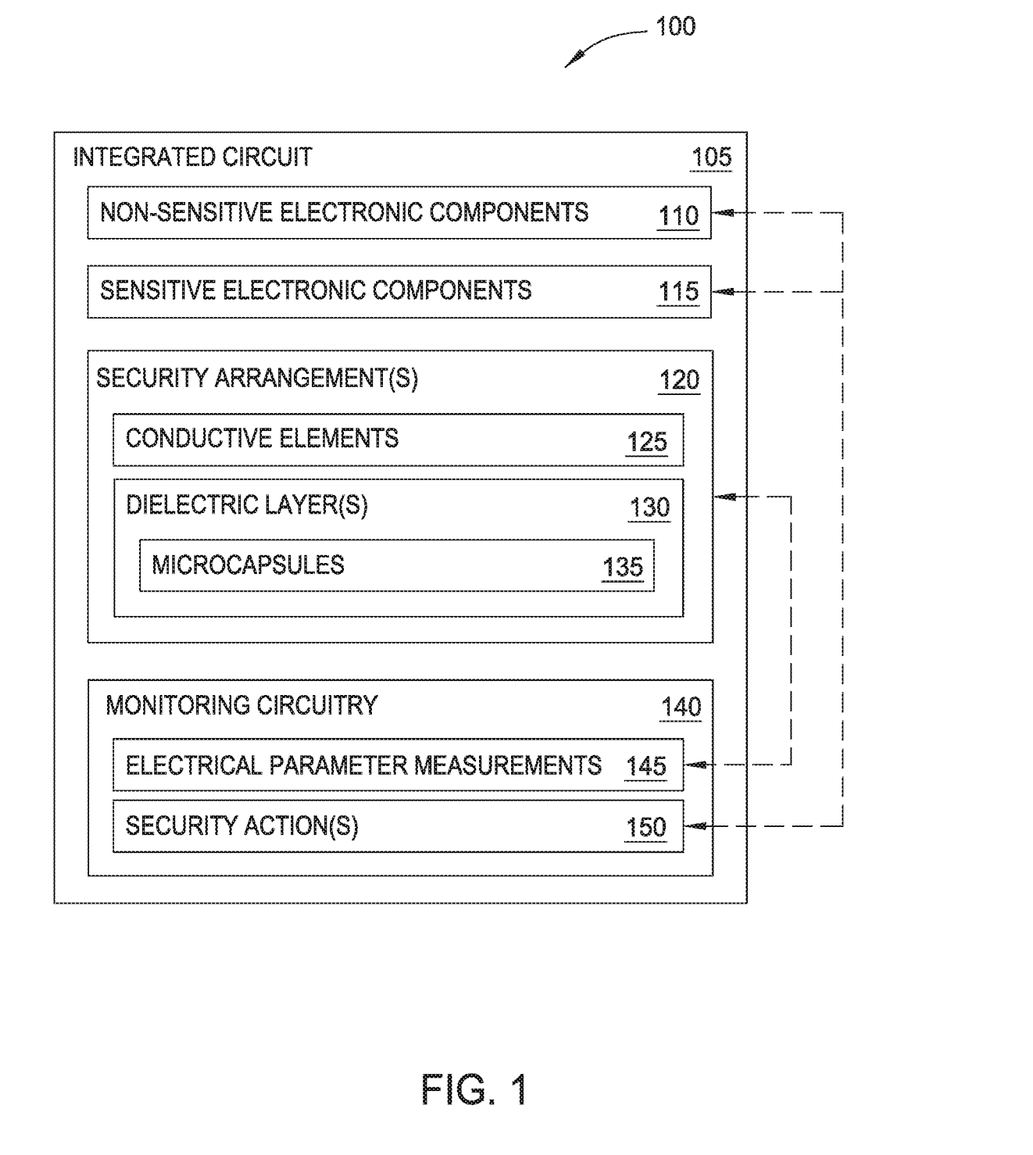
FIG. 1 is a block diagram illustrating an apparatus comprising an exemplary security arrangement, according to embodiments described herein.

FIG. 1 is a block diagram illustrating an apparatus 100 comprising an exemplary security arrangement, according to embodiments described herein. The apparatus 100 comprises an integrated circuit (IC) 105 having any suitable functionality. Some non-limiting examples of the IC 105 include logic ICs such as microprocessors, microcontrollers, and field-programmable gate arrays (FPGAs). Other non-limiting examples of the IC 105 include memory ICs such as random access memory (RAM), read-only memory (ROM), and non-volatile RAM (or Flash memory). In some cases, a memory IC may be integrated in a storage device such as a solid-state drive (SSD).

The IC 105 comprises a plurality of electronic components, which may include one or more non-sensitive electronic components 110 and one or more sensitive electronic components 115. The sensitive electronic components 115 may generally include proprietary or otherwise sensitive functionality and/or may store sensitive data. For example, the sensitive electronic components 115 may be used to perform cryptographic operations and may store one or more keys for cryptographic algorithms.

The IC 105 further comprises one or more security arrangement(s) 120 configured to protect some or all of the electronic components from being observed via physical intrusions to the IC 105. One example of a physical intrusion is drilling a small hole in the IC 105 to provide access for a probe to couple with electronic components of the IC 105. The security arrangement(s) 120 generally comprise one or more conductive layers that define a plurality of conductive elements 125. The security arrangement(s) 120 further comprise one or more dielectric layers 130 that include a plurality of microcapsules 135 embedded therein. A physical intrusion of the dielectric layer 130 causes one or more of the microcapsules 135 to be ruptured. Material that is encapsulated by the microcapsules 135 is released into the dielectric layer 130 when the microcapsules 135 are ruptured. The released material operates to change a conductivity of the dielectric layer 130 in at least a region proximate to the rupture site. The changed conductivity of the dielectric layer 130 affects electrical parameters related to one or more of the plurality of conductive elements 125.

In some embodiments, a single type of material(s) is included within each of the plurality of microcapsules 135. In other embodiments, the plurality of microcapsules 135 comprises a plurality of different types of encapsulated material(s). In one particular embodiment, first microcapsules 135 of a first type are configured to generate heat when ruptured by an external stimulus, and second microcapsules 135 of a second type are configured to release encapsulated material responsive to the generated heat. In some cases, the first microcapsules 135 and the second microcapsules 135 are blended to have a desired distribution within the dielectric layer 130.

The conductive elements 125 may be formed of any suitable conductive material(s). In one embodiment, the conductive elements 125 are formed in one or more copper layers of the IC 105, but other metallic and non-metallic conductive materials are possible. The conductive elements 125 may have any suitable dimensions and/or arrangement within the one or more conductive layers.

The conductive elements 125 are arranged in proximity to the microcapsules 135 such that a rupture of at least some of the microcapsules 135 causes a perceptible change to at least one measured electrical parameter associated with the conductive elements 125. Some non-limiting examples of the arrangement of microcapsules 135 include a substantially uniform distribution in the dielectric layer 130, and a substantially random distribution in the dielectric layer 130. In some embodiments, the microcapsules 135 are distributed throughout the dielectric layer 130. In other embodiments, the microcapsules 135 are localized and distributed in one or more regions of the dielectric layer 130 proximate to the location of conductive elements 125. In some cases, the microcapsules 135 are localized to one or more of the sensitive electronic components 115.

Each of the microcapsules 135 includes one or more encapsulated materials within a selected encapsulating material. The microcapsules 135 may, in general, be prepared according to methods disclosed in U.S. patent application Ser. No. 14/937,983, the entire contents of which are incorporated herein by reference. In some embodiments, a size of each microcapsule 135 is between about 1 micron and 1000 microns in diameter, although larger and smaller sizes are also possible. The encapsulating material may be included in any suitable form, such as shells that encapsulate individual particles, as a matrix or other cellular structure, and so forth. Some non-limiting examples of an encapsulating material include polymers, glass, and ceramics. In some embodiments, the microcapsules 135 comprise polymer microcapsules comprising a urea formaldehyde shell with an aqueous solution core. In other embodiments, the microcapsules 135 are glass microballoons, cenospheres, and/or plastic microspheres, such as Expancel® microspheres produced by AkzoNobel N.V., and PHENOSET® microspheres produced by Asia Pacific Microspheres.

In some embodiments, the materials encapsulated in the microcapsules 135 include one or more active agents that are configured to perform a chemical reaction when some of the microcapsules 135 are ruptured. For example, some or all of the microcapsules 135 may include an active agent configured to react with a chemical that is included in other microcapsules 135 or otherwise included in the dielectric layer 130.

In other embodiments, the materials encapsulated in the microcapsules 135 include one or more inert materials. In some embodiments, the encapsulated materials include a salt solution or any suitable ionic liquid having a desired conductivity. Some non-limiting examples of salts include sodium chloride (NaCl), potassium chloride (KCl), calcium chloride ($CaCl_2$), magnesium chloride ($MgCl_2$), sodium dihydrogen phosphate ($NaH_2PO_4$), sodium hydrogen carbonate ($NaHCO_3$), and so forth. The composition of the salt solution may include one or more salts with a desired concentration. In one embodiment, the plurality of microcapsules 135 each comprises a salt solution or an ionic liquid that is encapsulated by a polymeric material. Other chemicals and/or compositions having a desired conductivity are also contemplated.

Whether the encapsulated materials are active or inert, the release of encapsulated materials operates to change a conductivity of the dielectric layer 130 at least within proximity of the location of the rupture. Those conductive elements 125 that are within proximity of the changed conductivity of the dielectric layer 130 will have a change in at least one electrical parameter. Some non-limiting examples of electrical parameters include a resistance, capacitance, and an inductance of one or more conductive elements 125.

In some embodiments, a rupture of a first microcapsule 135 causes a chain reaction in which a second microcapsule 135 is ruptured responsive to the rupture of the first microcapsule 135. The chain reaction using the first and second microcapsules 135 may be performed according to techniques described in U.S. patent application Ser. No. 15/459,573, the entire contents of which are incorporated herein by reference. In some cases, the rupture of the first microcapsule 135 may be described as being caused by a direct and/or external stimulus, and the rupture of the second microcapsule 135 may be described as being caused by an indirect stimulus. In this way, the effects caused by a physical rupture occurring in a first location may be detectable in a larger region (or influence zone) surrounding the first location.

In some embodiments, an external stimuli such as physical intrusion by a drill bit causes the first microcapsule 135 to rupture, which causes the first microcapsule 135 (or the contents thereof) to generate heat. Other types of external stimuli other than physical intrusion are also contemplated as being suitable for rupturing the first microcapsule 135. The heat from the rupture of the first microcapsule 135 can be used to trigger a security response, cure a surrounding resin material, or cause a phase change in a surrounding material, and/or respond to damage a portion of a composite component. In some embodiments, the first microcapsule 135 may include a first component within a first compartment and a second component within a second compartment, where the first component and second component are configured to react exothermically with each other. The rupture of the first microcapsule 135 causes a mixing of the first component and the second component. In one non-limiting example, the first component comprises iron (Fe) (such as an iron powder mixed with ferric nitrate ($Fe(NO_3)_3$)) and the second component comprises hydrogen peroxide ($H_2O_2$), although other combinations of components are also contemplated. In some embodiments, the second microcapsule 135 is configured to rupture responsive to the generated heat, and to release a salt solution or ionic liquid.

The IC 105 further comprises monitoring circuitry 140 configured to acquire electrical parameter measurements 145 for one or more conductive elements 125. In some embodiments, measurements are acquired for individual conductive elements 125, such as resistance measurements, inductance measurements, or capacitance measurements relative to a conductive element of the IC 105 outside of the plurality of conductive elements 125. In other embodiments, measurements are acquired for a grouping of conductive elements 125. For example, capacitance measurements may be acquired between multiple of the conductive elements 125. In another embodiment, a plurality of the conductive elements 125 is used to form a Wheatstone bridge. In such a case, the electrical parameter measurements 145 may be determined from an acquired output voltage, where changes in the output voltage indicate a change in an electrical parameter of one or more of the conductive elements 125.

The monitoring circuitry 140 may acquire the electrical parameter measurements 145 according to any suitable techniques. For example, capacitance measurements may be acquired using a timer circuit and calculating a frequency inversely proportional to capacitance, using a reference capacitor in a charge balancing scheme, using a capacitance bridge, using an op-amp integrator, and so forth. The monitoring circuitry 140 may include a memory to store the electrical parameter measurements 145 for the conductive elements 125. In some embodiments, the memory stores a plurality of electrical parameter measurements 145 for each of the conductive elements 125.

While depicted as included in the IC 105, in alternate embodiments the monitoring circuitry 140 is only partly included in, or is entirely separate from, the IC 105. In one embodiment, the monitoring circuitry 140 is entirely included in the IC 105 and may also be protected by the security arrangement(s) 120.

Using the electrical parameter measurements 145, the monitoring circuitry 140 is configured to detect a change in an electrical parameter for at least a first conductive element 125 of the plurality of conductive elements 125. The change in the electrical parameter indicates a physical intrusion of a dielectric layer 130 of the security arrangement 120. In some embodiments, upon detecting a change in an electrical parameter of one or more conductive elements 125, the monitoring circuitry 140 determines a location of the one or more conductive elements 125 within the security arrangement 120. In some embodiments, the monitoring circuitry 140 determines a location when the change in the electrical parameter is greater than a non-zero threshold value.

In some embodiments, based on the determined location of the one or more conductive elements 125, the monitoring circuitry 140 determines whether to perform a predefined security action 150. Stated another way, based on which electronic components of the IC 105 are overlapped by the one or more conductive elements 125, the monitoring circuitry 140 determines whether to perform the predefined security action 150. As used herein, a predefined security action 150 is generally performed by the IC 105 to obscure or thwart attempts to acquire information regarding electronic components of the IC 105. As used herein, a conductive element 125 "overlapping" a first electronic component is intended to include overlapping any conductive connections with the first electronic component (e.g., conductive traces connecting the first electronic component with at least a second electronic component). In this way, the security arrangement 120 can detect whether physical intrusions of the IC 105 are intended to target sensitive electronic components 115.

In some embodiments, the predefined security action 150 is selected from a group consisting of: a shutdown operation, a spoofing operation, and a self-destruct operation. Other suitable security actions 150 are also contemplated. The predefined security action 150 is applied to at least some of the electronic components that are overlapped by the conductive element 125. In some cases, the predefined security action 150 is applied to all of the overlapped electronic components. In other cases, the predefined security action 150 is applied to only the sensitive electronic components 115 that are overlapped by the conductive element 125. In this way, the predefined security action 150 can obscure or thwart attempts to acquire, via physical intrusions to the IC 105, information regarding the sensitive electronic components 115.

In some cases, the monitoring circuitry 140 determines that the one or more conductive elements 125 (i.e., having a changed electrical parameter) overlap only non-sensitive electronic components 110. In other words, the one or more conductive elements 125 do not overlap any sensitive electronic components 115. In one embodiment, the monitoring circuitry 140 determines to not perform a predefined security action 150 when the one or more conductive elements 125 do not overlap any sensitive electronic components 115. In another embodiment, the monitoring circuit 140 performs a first security action 150 when the one or more conductive elements 125 overlap any sensitive electronic components 115, and performs a second, different security action 150 when the one or more conductive elements 125 do not overlap any sensitive electronic components 115.

In some embodiments, a memory of the monitoring circuitry 140 may record or log detected changes in electrical parameters for the one or more conductive elements 125. In some cases, the monitoring circuitry 140 is further configured to perform a predefined security action 150 when a number of detected changes in electrical parameters or a number of conductive elements 125 exceeds a predefined threshold value. This may be done independent of whether the one or more conductive elements 125 overlap any sensitive electronic components 115. In one example, the monitoring circuitry 140 causes the IC 105 to perform a self-destruct operation responsive to a physical intrusion of several conductive elements 125, which more strongly suggests a deliberate attempt to acquire information regarding different electronic components of the IC 105.

Figure 2:
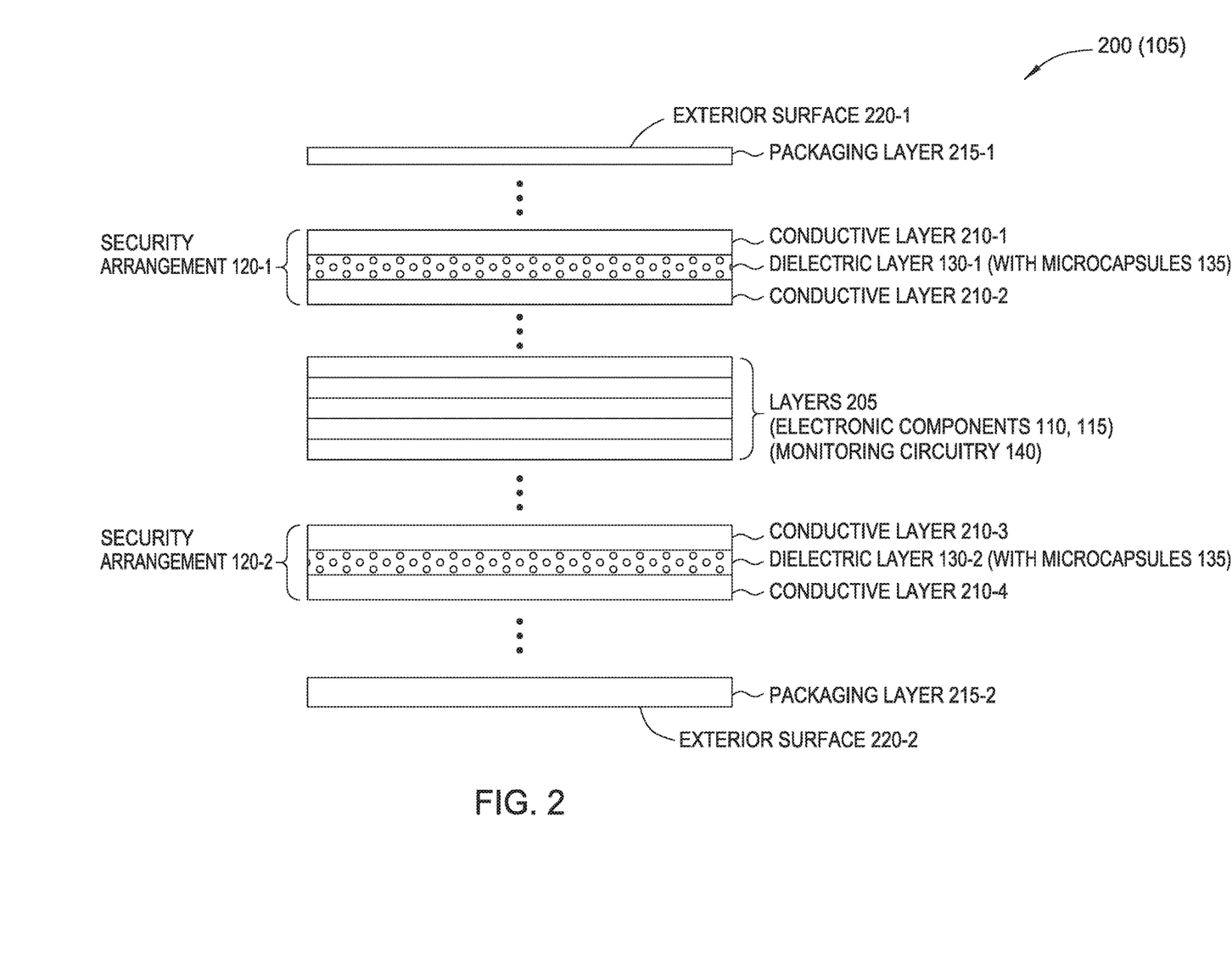
FIG. 2 is a schematic diagram illustrating an exploded cross-section of an integrated circuit comprising an exemplary security arrangement, according to embodiments described herein.

FIG. 2 is a schematic diagram illustrating an exploded cross-section of an IC 200 comprising an exemplary security arrangement 120, according to embodiments described herein. The IC 200 defines a plurality of exterior surfaces 220-1, 220-2. As shown, the exterior surfaces 220-1, 220-2 are defined by packaging layers 215-1, 215-2 that generally encapsulate the electronic components defined within the IC 200, but this is not a strict requirement.

The IC 200 comprises a plurality of layers 205 forming a plurality of electronic components, such as one or more sensitive electronic components 115 and/or one or more non-sensitive electronic components 110. While the individual layers of the plurality of layers 205 are not specifically labeled, the particular arrangements of layers for forming the plurality of electronic components will be understood by persons of ordinary skill in the art. Generally, the plurality of layers 205 can include one or more semiconductor layers, one or more dielectric layers, and/or one or more metal layers. As discussed above, the plurality of electronic components formed in the plurality of layers 205 may include some or all of the monitoring circuitry 140.

A first security arrangement 120-1 is disposed between the plurality of layers 205 and the exterior surface 220-1, and comprises a first conductive layer 210-1 patterned as a first plurality of first conductive elements. The first security arrangement 120-1 further comprises a second conductive layer 210-2 separated from the first conductive layer 210-1 by a first dielectric layer 130-1 and patterned as a second plurality of second conductive elements. The first dielectric layer 130-1 includes a plurality of microcapsules 135, such that a physical intrusion of the first dielectric layer 130-1 causes one or more of the plurality of microcapsules 135 to be ruptured, which operates to change a conductivity of the dielectric layer 130 in at least a region proximate to the rupture site.

One or more other security arrangements may be included in the IC 200. For example, the IC 200 may include a second security arrangement 120-2 disposed between the plurality of layers 205 and the exterior surface 220-2. The second security arrangement 120-2 comprises a third conductive layer 210-3 separated from a fourth conductive layer 210-4 by a second dielectric layer 130-2 comprising a plurality of microcapsules 135. Further, although the security arrangements 120-1, 120-2 are each shown as including two conductive layers 210-1, 210-2 or 210-3, 210-4, alternate embodiments may include a single conductive layer, or three or more conductive layers. Still further, other layers and/or other arrangements of the layers of the security arrangement 120 are contemplated.

Figure 3A:
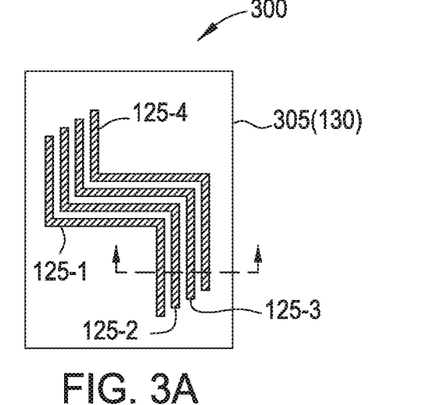
FIG. 3A is a schematic diagram of an exemplary arrangement of a plurality of conductive elements, according to embodiments described herein.

FIG. 3A is a schematic diagram of an exemplary arrangement 300 of a plurality of conductive elements, according to embodiments described herein. The arrangement 300 may be used in conjunction with other embodiments disclosed herein, such as the apparatus 100 depicted in FIG. 1 and/or the IC 200 depicted in FIG. 2.

The arrangement 300 includes a plurality of conductive elements 125-1, 125-2, 125-3, 125-4 that are arranged at a portion 305 of a surface, which may be defined within an IC such as the ICs 105, 200 that are discussed above. Although four (4) conductive elements 125-1, 125-2, 125-3, 125-4 are shown, alternate implementations may have a different number of conductive elements. In some embodiments, the conductive elements 125-1, 125-2, 125-3, 125-4 are formed in a metal layer that is deposited on a dielectric layer 130 of the IC. As shown, the conductive elements 125-1, 125-2, 125-3, 125-4 are patterned similarly and are arranged substantially parallel to each other. While one particular pattern of the conductive elements 125-1, 125-2, 125-3, 125-4 is shown, any suitable alternate patterns are also contemplated. In alternate embodiments, different ones of the conductive elements 125-1, 125-2, 125-3, 125-4 correspond to different patterns. Further, the conductive elements 125-1, 125-2, 125-3, 125-4 need not be arranged parallel to each other.

Although not shown, in some embodiments one or more of the conductive elements 125-1, 125-2, 125-3, 125-4 are electrically connected through conductive connection(s). In one non-limiting example, the conductive elements 125-1, 125-2, 125-3, 125-4 are connected to form a Wheatstone bridge. In another non-limiting example, all of the conductive elements 125-1, 125-2, 125-3, 125-4 are connected to form an effectively larger conductive element. In some embodiments, monitoring circuitry is configured to acquire electrical parameter measurements for each of the conductive elements 125-1, 125-2, 125-3, 125-4. For example, respective resistance measurements may be acquired for each of the conductive elements 125-1, 125-2, 125-3, 125-4.

Figure 3B:
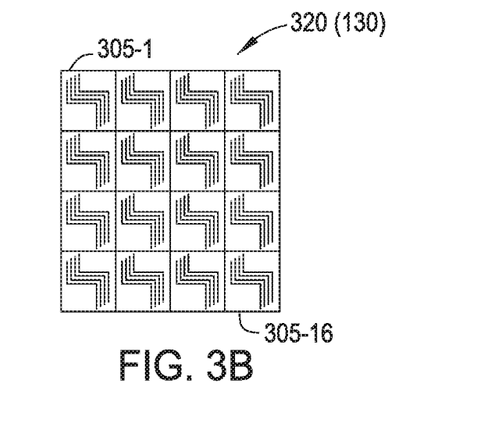
FIG. 3B is a schematic diagram of a plurality of conductive elements arranged as an exemplary repeating array, according to embodiments described herein.

In some embodiments, the plurality of conductive elements 125-1, 125-2, 125-3, 125-4 are included in a repeating array, such as the arrangement 320 depicted in FIG. 3B. As shown, the arrangement 320 comprises sixteen (16) different portions 305-1, . . . , 305-16 that are arranged in a 4×4 rectangular grid arrangement. Any suitable alternate arrangements of multiple portions 305 are also contemplated, such as different-sized patterns, staggered rectangular grid patterns, hexagonal grid patters, non-regular patterns, and so forth. Further, while each of the portions 305-1, . . . , 305-16 is depicted as including substantially a same arrangement of conductive elements, in alternate implementations different portions 305 of the arrangement 320 may include different arrangements of conductive elements.

In one embodiment, the arrangement 320 extends to overlap substantially all of the dielectric layer 130. In another embodiment, the arrangement 320 overlaps only a portion of the dielectric layer 130. In either case, the portions 305 of the arrangement 320 (i.e., each including one or more conductive elements) may be arranged to overlap only selected area(s) of the dielectric layer 130. For example, one or more portions 305 may be arranged to overlap with sensitive electronic components of the IC. In this example, those areas of the IC having only non-sensitive electronic components are not overlapped by portions 305, although this is not a requirement.

Figure 3C:
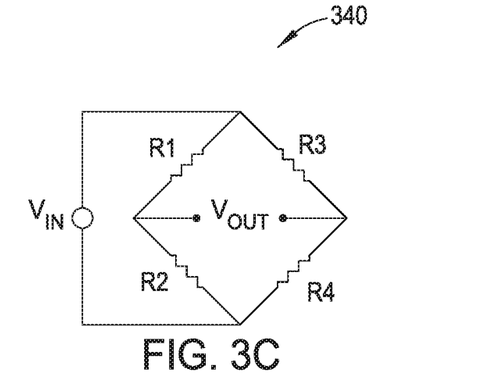
FIG. 3C is a diagram illustrating a Wheatstone bridge circuit using the plurality of conductive elements, according to embodiments described herein.

FIG. 3C is a diagram illustrating a Wheatstone bridge circuit 340 using the plurality of conductive elements, according to embodiments described herein. The Wheatstone bridge circuit 340 may be used in conjunction with other embodiments disclosed herein, such as the arrangement 300 of FIG. 3A and/or the arrangement 320 of FIG. 3B. One benefit of the Wheatstone bridge circuit 340 is a significantly increased accuracy of resistance (or other electrical parameters) measurements, when compared with a simple voltage divider circuit.

The Wheatstone bridge circuit 340 comprises four (4) resistances: R1, R2, R3, and R4. Resistances R1, R4 are oppositely arranged between the resistances R2 and R3, and resistances R2, R3 are oppositely arranged between the resistances R1 and R4. An input voltage Vin, which may be any suitable direct current (DC) or alternating current (AC) signal, is applied between a connection point of resistances R1, R3 and a connection point of resistances R2, R4. An output voltage Vout is measured between a connection point of resistances R1, R2 and a connection point of resistances R3, R4. When the conductivity of the dielectric layer 130 changes due to the release of materials from the microcapsules, one or more of the resistances R1, R2, R3, and R4 will change, which in turn produces a change in the output voltage Vout.

Each resistance R1, R2, R3, R4 corresponds to at least one conductive element. In one embodiment, each resistance R1, R2, R3, R4 corresponds to a respective one of the plurality of conductive elements 125-1, 125-2, 125-3, 125-4, such that a single portion 305 corresponds to the Wheatstone bridge circuit 340. In another embodiment, the conductive elements 125-1, 125-2, 125-3, 125-4 are conductively coupled and correspond to a single resistance (e.g., R1) of the Wheatstone bridge circuit 340.

As discussed above, when microcapsule-encapsulated material(s) are released into the dielectric layer 130, a conductivity of the dielectric layer 130 changes in proximity of the microcapsule rupture. The change in conductivity affects a resistance value for one or more of the resistances R1, R2, R3, R4, which is reflected in a changed output voltage Vout value. In some embodiments, the Wheatstone bridge circuit 340 is in a balanced state when the conductivity of the dielectric layer 130 is unchanged, and is in an unbalanced state when the conductivity changes due to microcapsule rupture.

Although the Wheatstone bridge circuit 340 has been discussed in terms of resistances of the conductive elements, alternate implementations may correspond to different electrical parameters. For example, one or more of the resistances R1, R2, R3, R4 may be substituted with inductance(s) of the conductive elements, capacitance(s) of the conductive elements to a reference (such as ground), impedances of the conductive elements, and so forth. Some non-limiting examples of suitable alternate bridge circuits include a Kelvin bridge, a Schering bridge, a Wien bridge, and a Maxwell bridge.

Figure 3D:
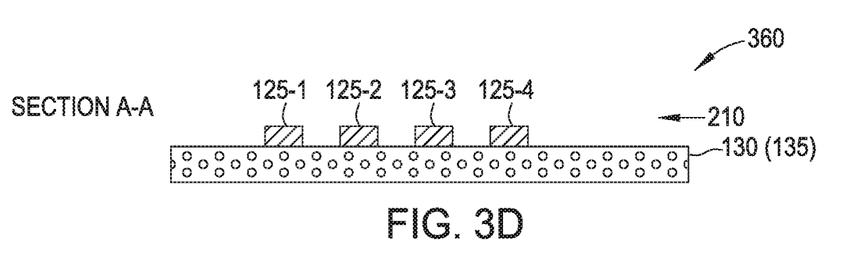
FIGS. 3D and 3E are cross-section views of an arrangement of a plurality of conductive elements, according to embodiments described herein.
Figure 3E:
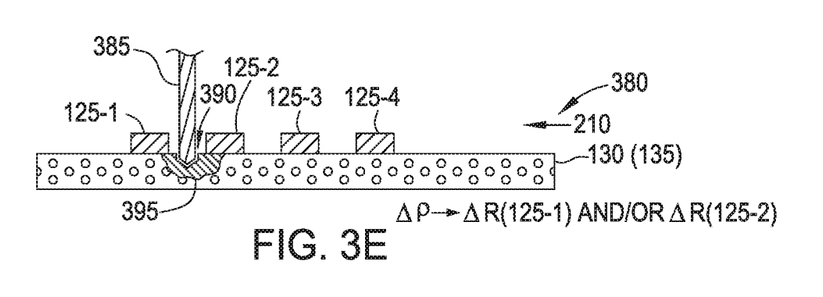

FIGS. 3D and 3E are cross-section views 360, 380 of an arrangement of a plurality of conductive elements, according to embodiments described herein. More specifically, views 360, 380 correspond to section A-A denoted in arrangement 300 of FIG. 3A and depict some or all of an exemplary security arrangement 120 (FIG. 1). In views 360, 380, each of the plurality of conductive elements 125-1, 125-2, 125-3, 125-4 is disposed within a single conductive layer 210.

Within view 360, none of the microcapsules 135 that are included in the dielectric layer 130 has been ruptured. Alternately, some of the microcapsules 135 may be ruptured, but the type and/or amount of material that is released by the ruptured microcapsules is such that there is substantially no change in the electrical parameter(s) of interest for any of the plurality of conductive elements 125-1, 125-2, 125-3, 125-4. Thus, a conductivity of the dielectric layer 130 is considered substantially unchanged. View 360 may therefore correspond to a "normal" operational state of the IC, in which no physical intrusion of the dielectric layer 130 has been detected and in which no security action is responsively performed.

Within view 380, a drill bit 385 has caused a physical intrusion of the dielectric layer 130 at location 390. As shown, location 390 occurs between conductive elements 125-1, 125-2, but a physical intrusion may alternately breach at least one conductive element. The physical intrusion at location 390 causes a physical rupture of one or more microcapsules 135 of the dielectric layer 130. As discussed above, in some cases, the physical rupture can cause one or more other microcapsules 135 to be chemically ruptured in a chain reaction. The release of material from the physically and/or chemically ruptured microcapsules 135 causes a changed conductivity $\Delta\rho$ (delta rho) of the dielectric layer 130 to occur in a region 395 that is proximate to the location 390. The changed conductivity $\Delta\rho$ causes at least one of the conductive elements 125-1, 125-2 disposed proximately to the region 395 to have one or more changed electrical parameters. As shown in view 380, the changed conductivity $\Delta\rho$ causes a change in resistance for the conductive element 125-1 (that is, $\Delta R(\mathbf{125\text{-}1})$) and/or a change in resistance for the conductive element 125-2 (that is, $\Delta R(\mathbf{125\text{-}2})$). The one or more microcapsules 135 may be further configured to rupture responsive to external stimuli other than a physical intrusion, but this is not a requirement. When the electrical parameter measurements reflect the $\Delta R(\mathbf{125\text{-}1})$ and/or $\Delta R(\mathbf{125\text{-}2})$, the monitoring circuitry may determine whether or not to perform a predefined security action.

Beneficially, the use of microcapsules 135 to change a conductivity of the dielectric layer 130 in a region proximate to the location of the physical intrusion allows the physical intrusions to be detected using fewer and/or smaller conductive elements 125-1, 125-2, 125-3, 125-4, which can reduce the overall complexity of the security arrangement and/or associated fabrication costs. Consequently, the spacing between two adjacent conductive elements 125-1, 125-2 need not be so close such that a physical intrusion will necessarily overlap with one or both of the adjacent conductive elements 125-1, 125-2. For example, assume that the drill bit 385 has a diameter of four (4) microns. Using a dielectric layer 130 having microcapsules 135 permits the detection of physical intrusions even where adjacent conductive elements 125-1, 125-2 are spaced apart more than the four (4) micron diameter of the drill bit.

While the discussion of views 360, 380 above focuses on detecting changes in resistance value(s) for one or more of the plurality of conductive elements 125-1, 125-2, 125-3, 125-4, similar techniques may be used to detect changes in other electrical parameters related to the plurality of conductive elements 125-1, 125-2, 125-3, 125-4.

Figure 4:
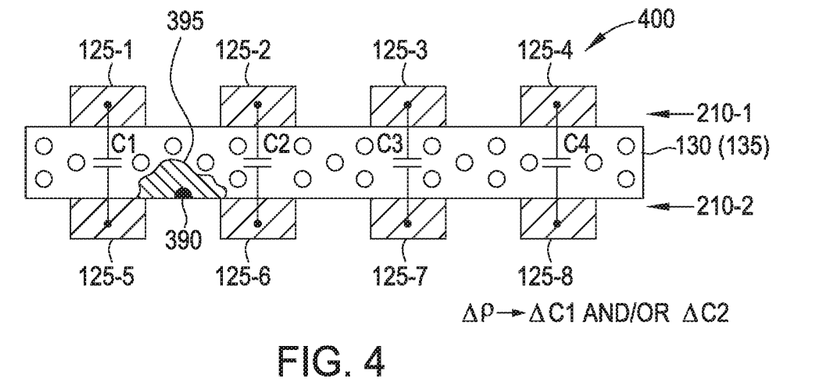
FIG. 4 is a cross-section view of a plurality of capacitive elements formed using different conductive layers, according to embodiments described herein.

FIG. 4 is a cross-section view of a plurality of capacitive elements formed using different conductive layers, according to embodiments described herein. Arrangement 400 depicts some or all of an exemplary security arrangement 120 (FIG. 1). Within arrangement 400, a first conductive layer 210-1 and a second conductive layer 210-2 are disposed on opposite sides of a dielectric layer 130. Each of the conductive elements 125-1, 125-2, 125-3, 125-4 included in the first conductive layer 210-1 is substantially overlapping with a respective conductive element 125-5, 125-6, 125-7, 125-8 included in the second conductive layer 210-2.

Each pairing of conductive elements from the first conductive layer 210-1 and the second conductive layer 210-2 forms a respective capacitance, which may be the electrical parameter measured by monitoring circuitry. As shown, capacitance C1 is formed by the pairing of conductive elements 125-1, 125-5, capacitance C2 is formed by the pairing of conductive elements 125-2, 125-6, capacitance C3 is formed by the pairing of conductive elements 125-3, 125-7, and capacitance C4 is formed by the pairing of conductive elements 125-4, 125-8.

As shown, a physical intrusion of the dielectric layer 130 has occurred at location 390 between capacitances C1 and C2. Alternately, a physical intrusion may breach at least one of the conductive elements that are used to form the capacitances C1 and C2. The physical intrusion at location 390 causes a physical rupture of one or more microcapsules 135 of the dielectric layer 130. As discussed above, in some cases, the physical rupture can cause one or more other microcapsules 135 to be chemically ruptured in a chain reaction. The release of material from the physically and/or chemically ruptured microcapsules 135 causes a changed conductivity $\Delta\rho$ (delta rho) of the dielectric layer 130 to occur in a region 395 that is proximate to the location 390. The changed conductivity $\Delta\rho$ causes a change to at least one of the capacitances C1, C2 disposed proximately to the region 395. As shown in arrangement 400, the changed conductivity $\Delta\rho$ causes a change in capacitance C1 (that is, $\Delta C1$) and/or a change in capacitance C2 (that is, $\Delta C2$). When the electrical parameter measurements reflect the $\Delta C1$ and/or $\Delta C2$, the monitoring circuitry may determine whether or not to perform a predefined security action.

Figure 5:
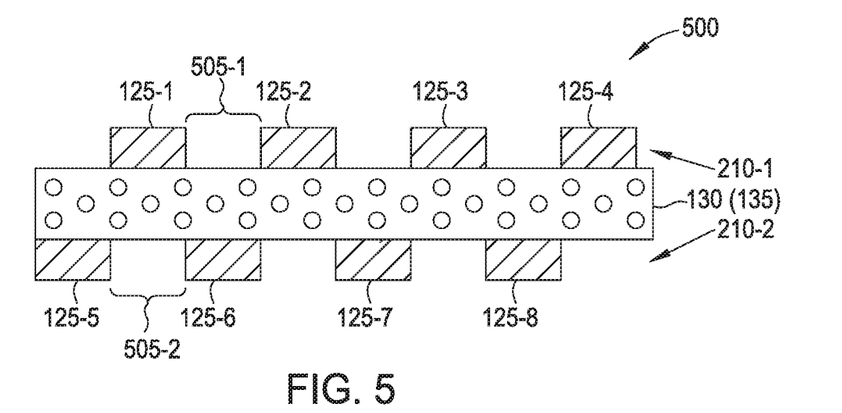
FIG. 5 is a cross-section view of an overlapping arrangement using different conductive layers, according to embodiments described herein.

Other implementations of the security arrangement that are consistent with the techniques described above are also contemplated. FIG. 5 is a cross-section view of an overlapping arrangement 500 using different conductive layers, according to embodiments described herein. Arrangement 500 depicts some or all of an exemplary security arrangement 120 (FIG. 1). Within arrangement 500, a first conductive layer 210-1 and a second conductive layer 210-2 are disposed on opposite sides of a dielectric layer 130. Each of the conductive elements 125-1, 125-2, 125-3, 125-4 included in the first conductive layer 210-1 partly overlaps with a respective one or more conductive elements 125-5, 125-6, 125-7, 125-8 included in the second conductive layer 210-2. A gap 505-1 that is defined between adjacent conductive elements 125-1, 125-2 of the first conductive layer 210-1 is overlapped by conductive element 125-6 of the second conductive layer 210-2. A gap 505-2 that is defined between adjacent conductive elements 125-5, 125-6 of the second conductive layer 210-2 is overlapped by conductive elements 125-1 of the first conductive layer 210-1. Such an overlapping arrangement may be beneficial for improved detection of physical intrusions of the security arrangement. For example, the overlapping arrangement tends to increase the probability that a physical intrusion will breach at least one of the conductive elements. Even where a physical intrusion does not breach a conductive element, the overlapping arrangement also tends to increase the number of conductive elements that will have an electrical parameter affected by the change in conductivity of the dielectric layer 130 due to ruptured microcapsules 135.

Figures 6A, 6B:
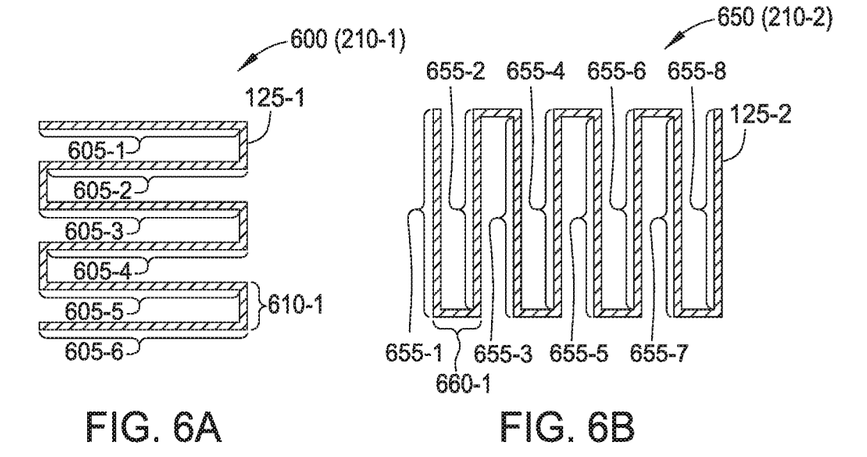
FIGS. 6A and 6B are top views of conductive elements having a serpentine shape, according to embodiments described herein.

FIGS. 6A and 6B are top views of conductive elements having a serpentine shape, according to embodiments described herein. View 600 generally corresponds to a first conductive layer 210-1 of an exemplary security arrangement 120 (FIG. 1), and view 650 generally corresponds to a second conductive layer 210-2 of the exemplary security arrangement 120.

Within view 600, the conductive element 125-1 is formed as a first serpentine shape defining a plurality of first parallel conductive segments 605-1, 605-2, 605-3, 605-4, 605-5, 605-6. Each of the first parallel conductive segments 605-1, 605-2, 605-3, 605-4, 605-5, 605-6 has a long axis extending along a first dimension. Adjacent segments of the first parallel conductive segments 605-1, 605-2, 605-3, 605-4, 605-5, 605-6 are coupled by conductive connecting segments. For example, the first parallel conductive segments 605-5 and 605-6 are coupled through a connecting segment 610-1.

Within view 650, the conductive element 125-2 is formed as a second serpentine shape defining a plurality of second parallel conductive segments 655-1, 655-2, 655-3, 655-4, 655-5, 655-6, 655-7, 655-8. Each of the second parallel conductive segments 655-1, 655-2, 655-3, 655-4, 655-5, 655-6, 655-7, 655-8 has a long axis extending along a second dimension that is substantially orthogonal to the first dimension.

Such an overlapping arrangement of conductive elements 125-1, 125-2 may be beneficial for improved detection of physical intrusions of the security arrangement. For example, the overlapping arrangement tends to increase the probability that a physical intrusion will breach at least one of the conductive elements. Even where a physical intrusion does not breach a conductive element, the overlapping arrangement also tends to increase the number of conductive elements that will have an electrical parameter affected by the change in conductivity of the dielectric layer 130 due to ruptured microcapsules 135.

Figure 7:
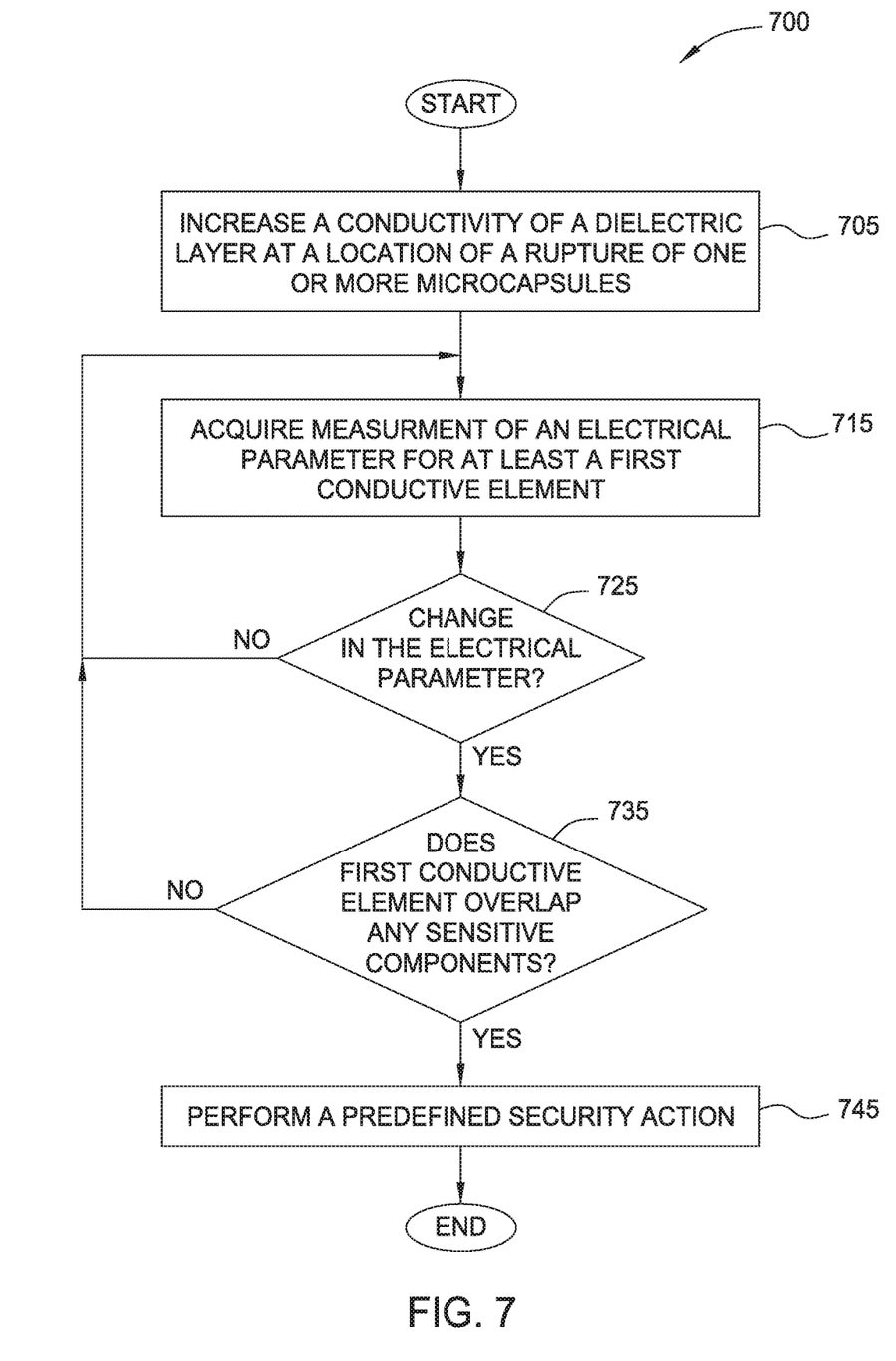
FIG. 7 illustrates a method for use with a security arrangement comprising a plurality of conductive elements and a dielectric layer comprising a plurality of microcapsules, according to embodiments described herein.

FIG. 7 illustrates a method 700 for use with a security arrangement comprising a plurality of conductive elements and a dielectric layer comprising a plurality of microcapsules, according to embodiments described herein. The method 700 may be used in conjunction with various embodiments described herein. For example, the method 700 may be performed by monitoring circuitry 140 coupled with the security arrangement 120, as illustrated in FIG. 1.

Method 700 begins at block 705, where a conductivity of a dielectric layer increases at a location of a rupture of one or more microcapsules. In some embodiments, the microcapsule rupture is responsive to a physical intrusion of the dielectric layer. At block 715, the monitoring circuitry acquires a measurement of an electrical parameter for at least a first conductive element, and at block 725, the monitoring circuitry determines whether a change has occurred in the electrical parameter. In some embodiments, the change is compared with a predefined non-zero threshold value. If no change has occurred ("NO"), the method returns to block 715. However, if a change in the electrical parameter has occurred ("YES"), the method proceeds to block 735 and the monitoring circuitry determines whether the first conductive element (i.e., associated with the changed electrical parameter) overlaps any sensitive electronic components. If the first conductive element does not overlap any sensitive electronic components ("NO"), the method returns to block 715. In some embodiments, block 735 may further include determining to not perform a predefined security action before returning to block 715. However, if the first conductive element does overlap one or more sensitive electronic components, the method proceeds to block 745, where the monitoring circuitry performs a predefined security action. Method 700 ends following completion of block 745.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present disclosure, other and further embodiments of the disclosure may be devised without departing from the basic scope thereof, and the scope thereof is determined by the claims that follow.

What is claimed is:

1. An apparatus comprising:
a plurality of conductive elements arranged within at least a first conductive layer;
one or more electronic components arranged within one or more other layers;
a dielectric layer comprising a plurality of microcapsules, the first conductive layer arranged on a first side of the dielectric layer; and
monitoring circuitry coupled with the plurality of conductive elements and configured to:
detect a change in an electrical parameter for at least a first conductive element of the plurality of conductive elements, wherein the change in the electrical parameter indicates a physical intrusion of the dielectric layer that causes a rupture of one or more microcapsules of the plurality of microcapsules;
when the first conductive element overlaps at least one sensitive electronic component of the one or more electronic components, performing a predefined security action responsive to the change in the electrical parameter; and
when the first conductive element overlaps only non-sensitive electronic components of the one or more electronic components, determining to not perform the predefined security action.

2. The apparatus of claim 1, wherein the rupture of one or more microcapsules increases a conductivity of the dielectric layer at a location of the rupture.

3. The apparatus of claim 2, wherein the plurality of microcapsules each comprise a salt solution or an ionic liquid encapsulated by a polymeric material.

4. The apparatus of claim 2, wherein the physical intrusion of the dielectric layer causes a rupture of a first microcapsule, and wherein the rupture of the first microcapsule causes a subsequent rupture of a second microcapsule.

5. The apparatus of claim 1, wherein the plurality of conductive elements form a Wheatstone bridge, wherein detecting a change in an electrical parameter comprises detecting a change in a resistance for the first conductive element.

6. The apparatus of claim 1, wherein the first conductive element is arranged in the first conductive layer, and wherein the plurality of conductive elements further comprises:
a second conductive element within a second conductive layer on an opposing second side of the dielectric layer.

7. The apparatus of claim 6, wherein the first conductive element is formed as a first serpentine shape defining a plurality of first parallel conductive segments, the first parallel conductive segments each having a long axis extending along a first dimension, and
wherein the second conductive element is formed as a second serpentine shape defining a plurality of second parallel conductive segments, the second parallel conductive segments each having a long axis extending along a second dimension that is substantially orthogonal to the first dimension.

8. The apparatus of claim 6, wherein the first conductive element is one of a plurality of first conductive elements arranged in the first conductive layer, wherein the second conductive element is one of a plurality of second conductive elements arranged in the second conductive layer, and wherein the plurality of first conductive elements are arranged to overlap one or more gaps defined between the plurality of second conductive elements.

9. The apparatus of claim 6, wherein detecting a change in an electrical parameter comprises detecting a change in a capacitance between the first conductive element and the second conductive element.

10. The apparatus of claim 1, wherein the plurality of conductive elements are formed as a repeating array within the first conductive layer.

11. An integrated circuit comprising:
one or more layers having a plurality of electronic components defined therein; and
a security arrangement comprising:
a plurality of conductive elements arranged within at least a first conductive layer and overlapping at least some of the plurality of electronic components; and
a dielectric layer comprising a plurality of microcapsules, the first conductive layer arranged on a first side of the dielectric layer; and
monitoring circuitry configured to:
detect, responsive to a physical intrusion of the security arrangement that causes a rupture of one or more microcapsules of the plurality of microcapsules, a change in an electrical parameter for at least a first conductive element of the plurality of conductive elements;
when the first conductive element overlaps at least one sensitive electronic component of the one or more electronic components, performing a predefined security action responsive to the change in the electrical parameter; and
when the first conductive element overlaps only non-sensitive electronic components of the one or more electronic components, determining to not perform the predefined security action.

12. The integrated circuit of claim 11, wherein the rupture of one or more microcapsules increases a conductivity of the dielectric layer at a location of the rupture.

13. The integrated circuit of claim 12, wherein the plurality of microcapsules each comprise a salt solution or an ionic liquid encapsulated by a polymeric material.

14. The integrated circuit of claim 12, wherein the physical intrusion of the security arrangement causes a rupture of a first microcapsule, and wherein the rupture of the first microcapsule causes a subsequent rupture of a second microcapsule.

15. The integrated circuit of claim 11, wherein the plurality of conductive elements form a Wheatstone bridge, wherein detecting a change in an electrical parameter comprises detecting a change in a resistance for the first conductive element.

16. A method for use with a security arrangement of an integrated circuit, the security arrangement overlapping at least some of a plurality of electronic components defined within the integrated circuit, the security arrangement comprising a plurality of conductive elements arranged within at least a first conductive layer, and further comprising a dielectric layer comprising a plurality of microcapsules, the method comprising:

increasing, responsive to a physical intrusion of the security arrangement that causes a rupture of one or more microcapsules of the plurality of microcapsules, a conductivity of the dielectric layer at a location of the rupture; and detecting, responsive to increasing the conductivity of the dielectric layer at the location of the rupture, a change in an electrical parameter for at least a first conductive element of the plurality of conductive elements; and determining, based on whether the first conductive element overlaps at least one sensitive electronic component of the plurality of electronic components, whether to perform a predefined security action.

17. The method of claim 16, wherein the predefined security action is selected from a group consisting of at least one of: a shutdown operation, a spoofing operation, and a self-destruct operation for the at least one sensitive electronic component.

18. The method of claim 16, wherein determining whether to perform a predefined security action comprises:

determining that the first conductive element overlaps only non-sensitive electronic components of the plurality of electronic components; and determining to not perform a predefined security action.

* * * * *